United States Patent [19]

Murakami

[11] Patent Number: 4,680,624
[45] Date of Patent: Jul. 14, 1987

[54] SIGNAL PROCESSING CIRCUIT FOR A COLOR VIDEO CAMERA PROVIDING SHADING CORRECTION BY VARYING THE BLACK CLAMPING LEVEL

[75] Inventor: Toshio Murakami, Yokohama, Japan

[73] Assignee: Hitachi, Ltd., Tokyo, Japan

[21] Appl. No.: 634,070

[22] Filed: Jul. 25, 1984

[30] Foreign Application Priority Data

Jul. 25, 1983 [JP] Japan .................................. 58-134341
Jul. 29, 1983 [JP] Japan .................................. 58-137544
Jul. 29, 1983 [JP] Japan .................................. 58-137543

[51] Int. Cl.⁴ ..................... H04N 9/077; H04N 5/18; H04N 9/64; H04N 9/68
[52] U.S. Cl. ....................................... 358/44; 358/27; 358/36; 358/163
[58] Field of Search .................... 358/41, 43, 44, 48, 358/50, 52, 163, 27, 36, 37

[56] References Cited

U.S. PATENT DOCUMENTS

| 2,445,040 | 7/1948 | Schade ............................ 358/163 |
| 3,936,870 | 2/1976 | Nakamura ........................ 358/27 |
| 4,359,756 | 11/1982 | Schneider et al. .................. 358/27 |
| 4,473,839 | 9/1984 | Noda .............................. 358/41 |
| 4,562,459 | 12/1985 | Sokei ............................. 358/27 |

FOREIGN PATENT DOCUMENTS

| 80134 | 7/1978 | Japan ............................. 358/27 |
| 105428 | 8/1979 | Japan ............................. 358/44 |

OTHER PUBLICATIONS

"The Journal of the Institute of Television Engineers of Japan", Mar. 1981, vol. 35, No. 3, pp. 183-194.

Primary Examiner—James J. Groody
Assistant Examiner—Randall S. Svihla
Attorney, Agent, or Firm—Antonelli, Terry & Wands

[57] ABSTRACT

A signal processing circuit for a color video camera using a single image pickup tube with less color phase and color noise at a low luminance portion, comprises in a clamping circuit for clamping a black level of a video signal produced from the image pickup element, a circuit for superimposing a shading correction signal onto a clamp reference signal. To further reduce the color phase and noise, there is provided a circuit for separating a luminance signal and a plurality of chrominance signals from a video signal produced from the image pickup tube, a circuit for demodulating the separated chrominance signals to obtain color difference signals with the luminance signal, a circuit for modulating a carrier with the color difference signals to obtain carrier color difference signals, a variable gain amplifier circuit provided in a transmitting path of the carrier color difference signals, and a circuit for detecting a luminance component of a level lower than a predetermined level from a luminance signal of a video signal produced from the image pickup tube, whereby the variable gain amplifier circuit operates such that when the level of the luminance signal is lower than a predetermined level, the amplitude of the carrier chrominance signal is made smaller as the luminance becomes lower.

13 Claims, 15 Drawing Figures

SIGNAL PROCESSING CIRCUIT FOR A COLOR VIDEO CAMERA PROVIDING SHADING CORRECTION BY VARYING THE BLACK CLAMPING LEVEL

BACKGROUND OF THE INVENTION

The present invention generally relates to a signal processing circuit of a video camera, and particularly to a signal processing circuit suitable for the improvement in quality at a low luminance portion in a video camera employing a single image pickup tube in order to obtain a color video signal.

It is important to make a home color video camera small and light and a single-tube color camera of the frequency separation type in which a single image pickup tube is provided with two sets of color stripe filters is widely used. As to such a single-tube color camera, some systems are disclosed, for example, in "THE JOURNAL OF THE INSTITUTE OF TELEVISION ENGINEERS OF JAPAN" March, 1981, vol. 35, No. 3, pp. 183-187. In brief, a luminance signal is derived as a base band signal from a target of an image pickup tube. A color stripe filter is provided with, for example, a red cut filter and a blue cut filter which are arranged to slant in the opposite directions to each other on a photoconductive surface of the image pickup tube, and a chrominance signal is derived as a multiple frequency carrier chrominance signal having frequency components determined depending on the arrangement of the color stripe filter. The luminance signal and the chrominance signal are amplified in the mixed state by a preamplifier and the black level is clamped by a clamp circuit. The signal DC restored by the clamp circuit is processed to be a predetermined video signal by a signal processing circuit which performs blanking processing, automatic gain control, and so on. The output of the signal processing circuit is passed through a low pass filter having a cut off frequency of 3 MHz to obtain a luminance signal Y. The output of the signal processing circuit is passed also through a low pass filter having a cut off frequency of 500 KHz to obtain a low frequency band component $Y_L$ of the luminance signal for obtaining a color difference signal. Further, for example, a carrier chrominance signal having quadrature modulated red and blue components can be obtained from the output of the signal processing circuit through a band pass filter, for example, having a band width of ±0.5 MHz with a center frequency of 3.58 MHz. The thus obtained quadrature modulated carrier chrominance signal is separated on the basis of the principle of vertical correlation of a picture image into a red carrier chrominance signal and a blue carrier chrominance signal through addition/subtraction operations as to a one-horizontal-period delayed line and the input and output of this delayed line. The two separated signals are amplitude-detected to obtain a red signal (R) and a blue signal (B), respectively. These signals Y, $Y_L$, R, and B are converted into a predetermined color video signal through a known encoder.

In such a single-tube color video camera, there are several points to be improved in picture quality at a low luminance portion.

In the case of an image pickup tube, generally, there occurs a residual image due to residual charges caused by the fact that charges can not be charged/discharged by one scanning because of the time constant determined by the scanning electron beam impedance and the storage capacitance of the photoconductive film. This phenomenon is remarkable at low luminance, and in the case of a single carrier frequency separation system, this residual image may be a magenta/green colored residual which will deteriorate picture quality. In order to reduce such a residual image, a method is practically used in which a bias light is additionally applied from the frontal or rear side of the photoconductive film, for example, by an LED so as to increase the potential at the rear side of the target to thereby lower the beam impedance during a dark period, even if there is no incident light on the camera lens. However, it is difficult to uniformly irradiate the photoconductive film by a bias light, and shading occurs at a dark portion. A shading may occur at a dark portion by nonuniformity in sensitivity due to deflection, or the like, resulting in deterioration in picture quality. Such a shading has a parabolic component and a saw-tooth component. In order to correct such a shading, means is known, as shown in FIG. 8 at page 186 of the above-mentioned reference, in which an optical black portion correction pulse is added to a video signal obtained from an image pickup tube, and the pulse is modulated with a vertical saw-tooth waveform and a parabolic waveform and added to the video signal and clamped.

In this shading correction circuit, however, a correction pulse oscillator circuit, a pulse modulator circuit, and so on, are additionally required.

Further, at a dark portion of a picture image, the color phase (difference in phase between the chrominance primary signal and the chrominance carrier reference) and the color noise may be significant and the reduction in S/N ratio due to increase in amplifier gain by the automatic gain control may increase color noise. In this regard, it has been suggested to provide a base clip circuit in the path of a carrier chrominance signal obtained through an encoder to reduce such color phase and color noise. The base clip circuit has an input/output characteristic which is non-linear at a small level to suppress a portion of a carrier chrominance signal having a level lower than a threshold level. If the level of the chrominance signal is small, the level becomes small not only at a dark portion, but also at a non-colored portion of a bright portion.

If the threshold of the base clip circuit is determined so as to make the color phase and the color noise not significant at a bright portion, it becomes difficult to sufficiently obtain an improvement in color noise at a dark portion or when a dark object is photographed. On the other hand, if the threshold of the base clip circuit is determined to be sufficiently large that the color phase and the color noise causes no problem even at a dark portion or when a dark object is photographed, the color signal information of a colored picture is also greatly suppressed so that color saturation at a bright portion is lost, thereby making it impossible to obtain a proper picture image.

SUMMARY OF THE INVENTION

An object of the present invention is to provide a signal processing circuit suitable for a single-tube color video camera, in which a good quality can be obtained with less color phase and color noise at a dark portion.

To attain the above-mentioned object, according to the present invention, paying attention to the fact that the black level of a video signal passed through a clamp circuit is clamped at a setting level, a shading correction signal of an opposite polarity to a vertical shading is superimposed onto a DC clamp potential in the clamp circuit. That is, the shading is corrected by varying the clamp potential, at the same time when a black portion is clamped.

In order to further improve the picture quality, according to the present invention, the suppression to reduce color phase and color noise at a relatively bright portion of a non-colored picture (there is no color information similar to a dark portion in view of the presence of only the luminance signal) concerning color phase and color noise at a dark portion is performed at a necessary minimum extent, while a luminance signal of a predetermined level relative to the rated level of a luminance signal before the AGC circuit (the level prior to initiation of the iris operation), that is a luminance signal of a level within a range from the black level to about $\frac{1}{2}-\frac{1}{4}$ of the white level is detected, so that the nearer the level approaches the black level, the more the gain of the carrier chrominance is attenuated. A circuit for controlling the gain and the color killer circuit for a highlight portion implemented as one circuit.

BRIEF DESCRIPTION OF THE DRAWINGS

The present invention will be apparent from the following detailed description in conjunction with the accompanying drawings, in which.

DETAILED DESCRIPTION OF THE PREFERRED EMBODIMENTS

Figure 1:
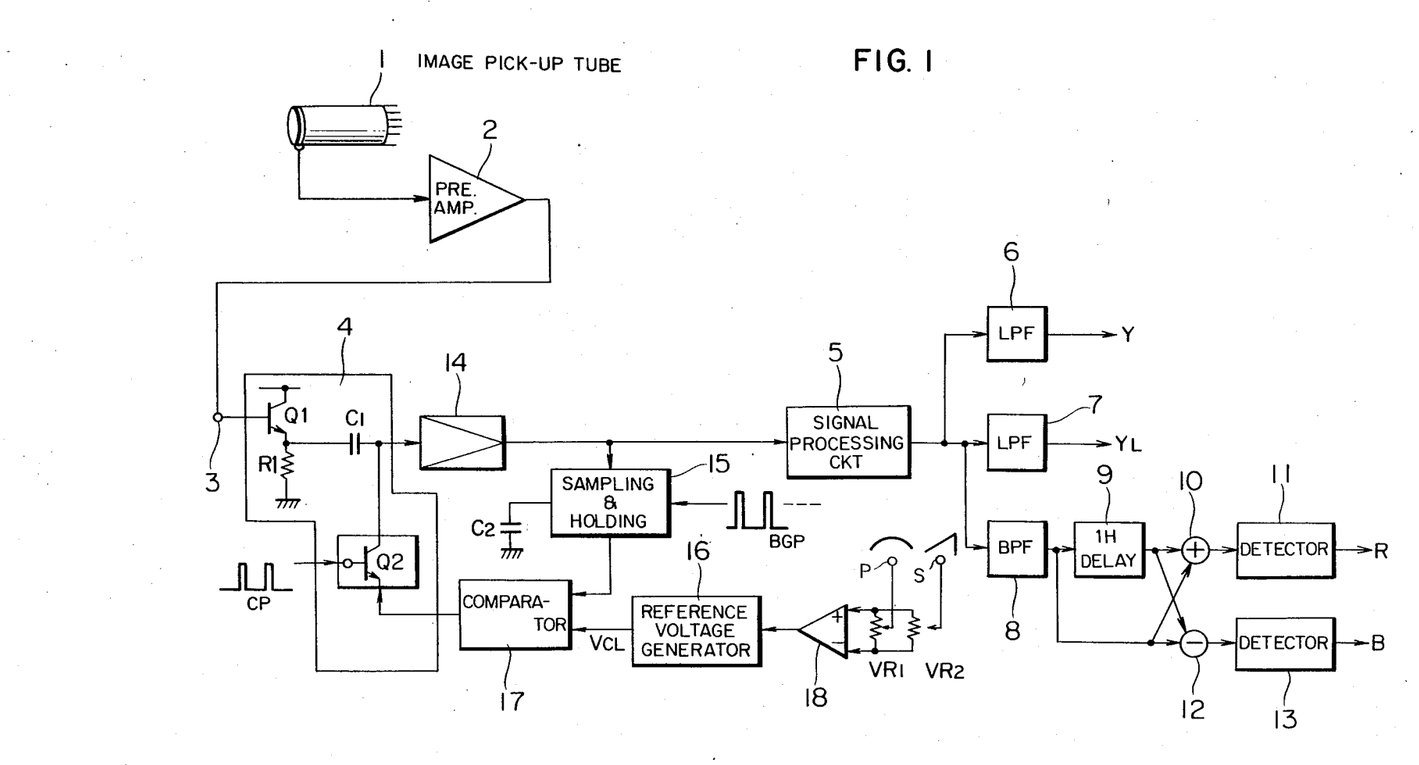
FIG. 1 is a circuit diagram showing an embodiment of the signal processing circuit of a video camera according to the present invention.
Figure 2:
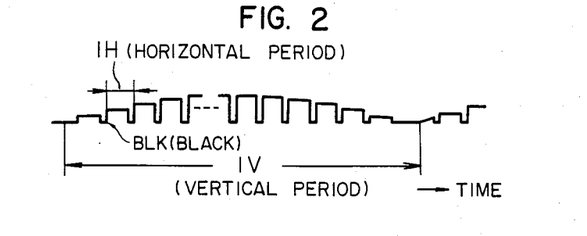
FIG. 2 shows an example of waveform when vertical shading occurs at a dark portion.

FIG. 1 shows an embodiment of a signal processing circuit of a video camera provided with a shading correction circuit according to the present invention. The output signal of a image pickup tube 1 is applied to a clamp circuit 4 through a preamplifier 2. This clamp circuit 4 is constituted by a feedback clamping circuit performing an operation which is a feature of the present invention. A signal in which a shading has occurred as shown in FIG. 2 appears at a terminal 3. In FIG. 2, for the purpose of simplification, only a vertically occurring parabolic shading waveform is illustrated and the BLK portion is at a black level obtained by blanking the cathode of the image pickup tube. In the clamp circuit 4 consitututed by a transistor Q1, an emitter resistor R1, a capacitor C1, and a transistor Q2, the black level of the signal shown in FIG. 2 is clamped by a clamp pulse CP applied to the base of the transistor Q2. The clamp pulse CP is a pulse train corresponding to the BLK period of FIG. 2 and the transistor Q2 is conductive during the period of this pulse and the signal is clamped at a clamp potential applied to the emitter of the transistor Q2.

Figure 3:
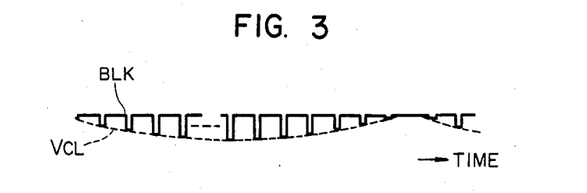
FIG. 3 shows an example of waveform after shading has been corrected.

The thus-clamped signal passes through an amplifier circuit 14 and is applied to a signal processing circuit 5 as well as to a sampling and holding circuit 15. The level of the black portion (BLK portion) of the signal is detected in the sample and hold circuit 15 and is compared by a comparator 17 with a reference voltage $V_{CL}$ from a reference voltage generator 16. The comparator 17 produces a voltage corresponding to the difference between the two voltages and the thus produced difference voltage is applied as a clamp voltage to the emitter of the transistor Q2. Thus, a feedback system with respect to the black level (BLK) is formed so that the black level of the signal produced from the amplifier 14 is stabilized. The level is stabilized to the reference value $V_{CL}$ determined by the reference voltage generator 16, and absorbs a DC offset voltage of the amplifier. The output of an operational amplifier 18 is connected to the input of the reference voltage generator 16. The operational amplifier 18 has two input terminals across which two variable resistors VR1 and VR2 are connected so that a parabolic waveform signal for shading correction and a saw-tooth waveform signal are applied to the operational amplifier 18 through the respective sliders of the variable resistors VR1 and VR2, thus obtaining a correction signal of a parabolic waveform, a saw-tooth waveform, or a mixture waveform therebetween, with a desired level and a desired polarity, at the output of the operational amplifier 18. If the thus obtained correction signal is superimposed on the reference DC potential to vary the black level clamp voltage ($V_{CL}$) in accordance with the shading condition, the clamp level varies in the opposite direction to the shading as shown in FIG. 3 so that the shading at the dark portion is corrected.

The shading-corrected signal is subjected through the signal processing circuit 5, to known signal processing such as blanking processing, amplitude adjustment through automatic gain control, and so on. Then, similar to a known circuit, a luminance signal and a chrominance signal are obtained through a low pass filter 6 for deriving a chrominance signal Y, a low pass filter 7 for deriving a low frequency band luminance signal $Y_L$, a band pass filter 8 for deriving a carrier chrominance signal, a one-horizontal-period delay line 9, an adder 10, a subtracter 12, detectors 11 and 13, and so forth. In a video camera, while not shown in the drawing, a luminance signal and color difference signals are obtained through encoders thereafter. The thus obtained luminance signal and color difference signals are added with a synchronizing signal and converted into a signal of a predetermined television system.

Figure 4:
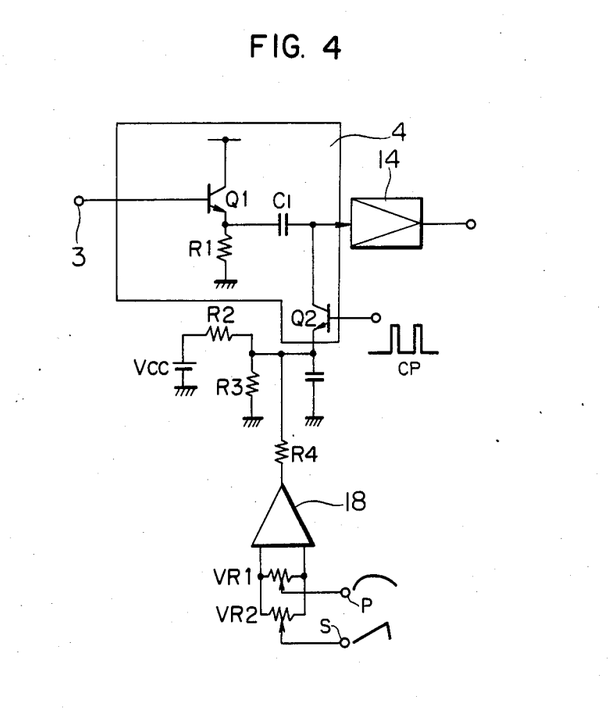
FIG. 4 is a main part circuit diagram showing another embodiment according to the present invention for correcting shading.

FIG. 4 is a circuit diagram showing another embodiment for shading correction. In this drawing, a main part is illustrated. Although a clamp circuit 4 is arranged in the same manner as in FIG. 1, no feedback system is constituted in the black level portion. In this embodiment, therefore, the DC voltage of the amplifier 14 is not stabilized. A reference DC voltage is applied by resistors R2 and R3 and a correction waveform is superimposed through a resistor R4.

In the embodiments as described above, a clamp circuit is effectively used to perform shading correction and the embodiments can be easily applied to a video camera. Although examples have been illustrated as to the embodiments in which vertical shading is corrected, the correction of horizontal shading can be performed by superimposing a correction signal onto the output signal of the preamplifier 2 although it is not shown in the drawings.

Figure 5:
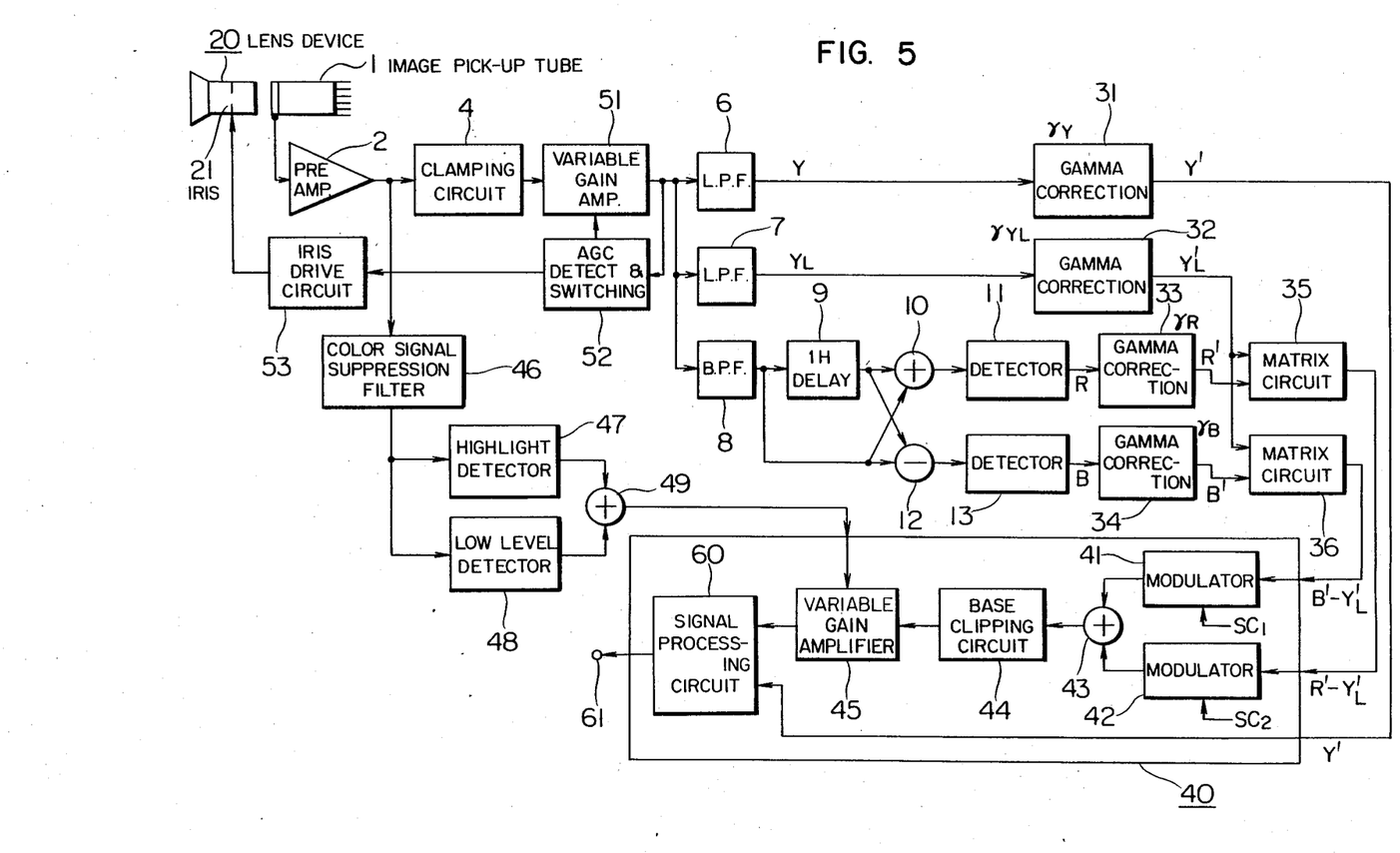
FIG. 5 is a block diagram showing a further embodiment according to the present invention for further improving picture quality.

FIG. 5 shows an embodiment for further reducing color phase and color noise at a dark portion slightly remaining even by the above-mentioned shading correction. In FIG. 5, a clamp circuit 4 having a shading correction function as shown in FIG. 1 or FIG. 4 is used. A signal, in which shading has been corrected and the black level has been clamped, is controlled to a predetermined level and produced through a variable gain amplifier 51. This control is effected by an AGC detector and switching circuit 52 and an iris drive circuit 53. That is, in the case where the amount of incident light onto a lens device 20 is relatively small, a control voltage is applied to the variable gain amplifier 51 to decrease the gain from the maximum gain value as the amount of incident light increases, and if the amount of incident light onto the lens device 20 further increases after a predetermined range of gain control has been completed, a control signal is applied to the iris drive circuit 53 so as to control an iris mechanism 21 to gradually close the iris from its opened state, thereby controlling the amount of light incident on an image pickup element 1. Thus, the level of the video signal obtained at the output of the variable gain amplifier 51 is controlled within a wide range to a predetermined rated level.

The video signal produced from the variable gain amplifier 51 is separated into a luminance signal Y, a low frequency band luminance signal $Y_L$, a red chrominance signal R, and a blue chrominance signal B through a circuit similar to that shown in FIG. 1. The separated luminance signal Y is subject to γ-processing through a gamma correction circuit (γY) 31 and applied to a color encoder 40. The separated and detected R and B signals are corrected through gamma correction circuits 33 and 34 respectively (into R' and B') and are applied to the respective inputs of color difference matrix circuits 35 and 36.

The luminance low frequency band component separated through a low pass filter 7 is subject to gamma correction through a gamma correction circuit (γ$_{YL}$) 32 and is applied to the respective other inputs of the color difference matrix circuits 35 and 36 to thereby obtain color difference signals (R'−Y'$_L$) and (B'−Y'$_L$) at the respective outputs of the color difference matrix circuits 35 and 36. The color difference signals (R'−Y'$_L$) and (B'−Y'$_L$) are applied to a color encoder 40. The color difference signals (R'−Y'$_L$) and (B'−Y'$_L$) respectively balance-modulate subcarriers SC1 and SC2 (3.58 MHz), which are different in phase by 90 degrees from each other, in modulators 41 and 42, and are then added to each other in an adder 43 to thereby obtain an NTSC carrier chrominance signal. This carrier chrominance signal is applied to a signal processing circuit 60 through a base clipping circuit 44 and a variable gain amplifier 45. The above-mentioned luminance signal Y' is also applied to the signal processing circuit 60 and subject to various kinds of signal processing, such as blanking, white level clipping, synchronizing signal addition, burst signal addition, and so forth, together with the carrier chrominance signal applied to the signal processing circuit 60, thereby obtaining an NTSC signal at an output terminal 61. The base clipping circuit 44 is for reducing a signal component N causing color shading and a white noise CN which are significant at a non-colored picture portion. That is, as shown in the input-output characteristics of FIG. 6, the circuit 44 suppresses a relatively small level portion of the input signal i.e., signal components whose signals are within the threshold level $V_{TH}$ by the non-linear input/output characteristics thereof.

Figures 6, 7, 8, 9:
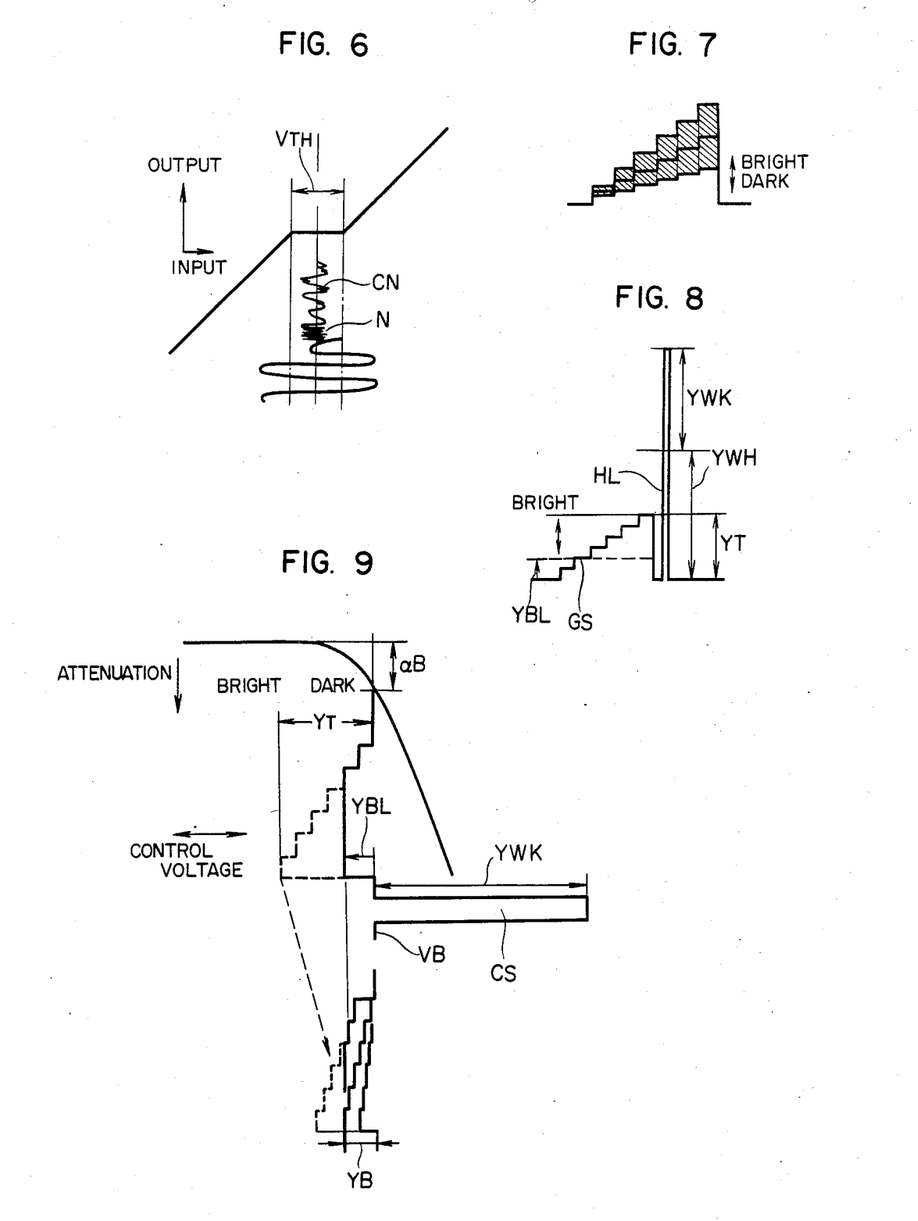
FIG. 6 is a characteristic diagram showing the relation of amplitude between input and output signals of a base clip circuit.
FIG. 7 is a diagram of waveform showing an example of a signal produced from an image pickup tube when a gray scale chart is photographed.
FIG. 8 shows a waveform of a luminance component obtained from an image pickup tube when a gray scale chart and a large highlight object are simultaneously photographed.
FIG. 9 is a diagram showing the relation between the control signal applied to the color killer circuit and the control characteristic.

Further, when a non-colored object such as a gray scale chart in which color stepwise changes from black to white, as shown in FIG. 7, is photographed, error components may occur in the color difference signal due to a tracking error of the chrominance signals (B', R') and the luminance signal (Y'$_L$) from the dark portion to the bright portion, shadings generated at the dark portion of the luminance signal (Y'$_L$) and the chrominance signals (B', R') due to a sensitive difference depending on the deflection of the image pickup tube, and so on, while if each of the color difference signals (B'−Y'$_L$) and (R'−Y'$_L$) is zero, the white balance is complete and no color phase occurs.

According to the present invention, shading correction is effected in the clamp circuit 4 and color phase and the like can be reduced by means of the variable gain amplifier 45 as described later, so that the threshold level $V_{TH}$ for base clipping can be set to a necessary minimum value so as to prevent such an event that even necessary information as to a colored picture portion is suppressed from occurring.

In order to explain the embodiment of FIG. 5, as a non-colored system photographing signal, assume a case in which a highlight signal HL extends significantly beyond the rated level $Y_T$ (the level where the iris is initiated to be closed) at the side of a gray scale signal GS and varies from black to white as shown by the waveform in FIG. 8. After having been passed through a color signal suppression filter 46 in which the carrier chrominance signal is taken away, a video signal before being applied to the variable gain amplifier 51 is applied to a highlight detector 47 for detecting a highlight signal of a level equal to or higher than a predetermined value ($Y_{WH}$) (for example, 2-3 times as large as the rated level $Y_T$) and also to a low luminance detector 48 which is a main part of the invention and for detecting a luminance signal from a black portion of a level lower than a predetermined value, for example a level $Y_{BL}$ which is equal to one third of the rated level $Y_T$ at highest, (that is a low luminance signal). The respective detectors 47 and 48 produce a highlight signal $Y_{WK}$ and a low luminance signal $Y_{BL}$ which are then added to each other by an adder 49. The output of the adder 49 is applied as a control signal to the variable gain amplifier 45 for controlling the gain of the carrier chrominance signal.

FIG. 9 is a diagram showing the relation between the control signal CS applied to the variable gain amplifier 45 and the control characteristic. In FIG. 9, the control signal CS is the output signal of the adder 49 which is the sum of the respective outputs of the highlight detector 47 and the low luminance detector 48.

As shown in FIG. 9, the operating point is set such that necessary attenuation factor ($\alpha_B$) can be obtained at a black level ($V_B$) corresponding to the darkest portion of the low luminance detection signal detected by the detector 48. Thus, within a control range ($Y_{BL}$) by the low luminance detection signal, the attenuation effect is the largest at the black level ($V_B$) and gradually decreases to the detection point (an operation point shown by the tip of an arrow $Y_{BL}$ in FIG. 9 or an operation level shown by a dotted line in FIG. 8, which corresponds to a white level side of a luminance signal to be detected). Since the luminance portion indicated by a broken line is clipped, gain control is not effected for a bright portion above the level range $Y_B$, while as the level becomes lower at the dark portion in which color phase and color noise are significantly large, the color phase and color noise can be more effectively suppressed.

On the other hand, at a bright portion, as described above, it is sufficient to suppress color phase and color noise at a necessary minimum level in the base clipping circuit 44 (low chroma suppression circuit) in view of the fact that the color phase and color noise components are less in quantity in comparison with those at a dark portion, so that there is no inconvenience that the chroma is largely lowered in a colored picture image.

Further, in an abnormally large highlight portion, gain is largely reduced by a highlight detection signal ($Y_{WK}$) to thereby prevent the picture from appearing green at a highlight portion. It is a matter of course that gain control circuits may be separately provided, while a single gain control circuit is commonly used in this embodiment.

Next, description will be made as to the reason why it is very effective to obtain a low luminance detection signal from a video signal before the variable gain amplifier (AGC circuit) 51. In the state where the intensity of illumination of an object is relatively large, that is within the operation range of the iris mechanism 21, the input level of the preamplifier 2 is made to be constant so that the video signal is maintained at a predetermined rated level before and after the variable gain amplifier 51, and the S/N ratio is maintained constant because the S/N ratio is determined depending on the amount of noise generated in the preamplifier. However, the intensity of illumination of the object becomes gradually lower (that is darker) to cause the iris to open, and as it becomes further lower as the operation range of the AGC circuit is reached so that the gain attenuation is controlled from its maximum quantity such that the gain is increased to maintain the output of the variable gain amplifier 51 constant. That is, when the AGC operation range is reached, as the intensity of illumination of the object becomes lower, the level of the video signal coming into the preamplifier becomes smaller and therefore the S/N ratio becomes smaller, so that color noise becomes more significant in proportion to the intensity of the illumination of the object. At the same time, the video signal level before the variable gain amplifier 51 becomes lower from the predetermined rated value $Y_T$ as the intensity of illumination of the object becomes smaller, so that the level of the bright portion becomes gradually lower than the predetermined detection level $Y_{BL}$ to allow the bright portion to be detected. That is, the control operation is such that as the S/N ratio becomes smaller, the gain attenuation is made more effective from a bright level portion to a black level portion, so that the color noise suppression effect is large all over the picture and the picture quality improving effect is remarkable.

At this time, although the chroma is also gradually lowered at a bright portion of a colored picture, the influence of this causes no problem with regard to provision of an unnatural feeling because the S/N ratio of the scene to be photographed is generally small.

Figure 10:
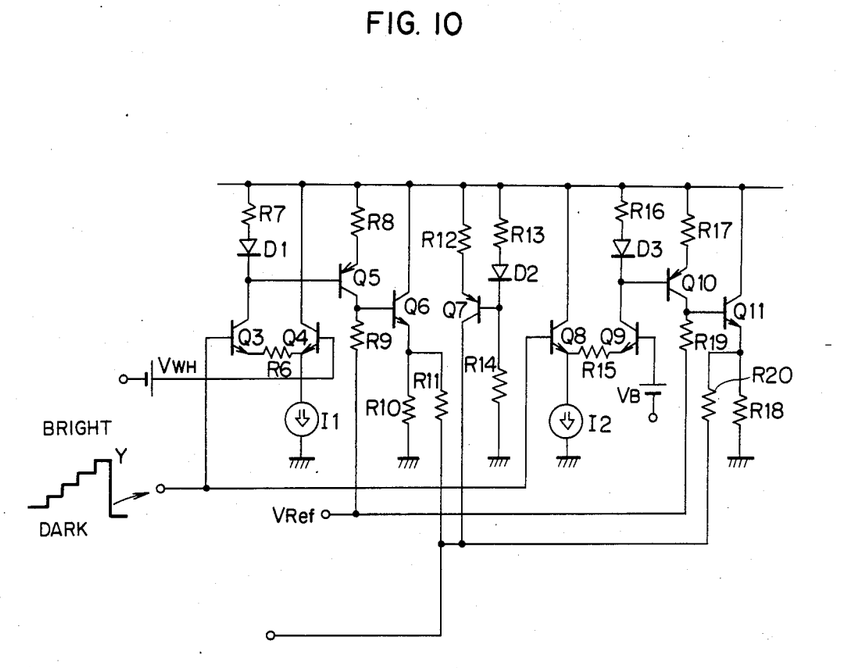
FIG. 10 is a circuit diagram showing an example of a specific circuit of a main part of the circuit shown in FIG. 5.

FIG. 10 is a circuit diagram showing an example of a specific circuit which is a main part of the present invention including the highlight (high luminance) signal detector 47, the low luminance signal detector 48, and the adder 49. In FIG. 10, the highlight signal detector 47 is constituted by transistors Q3, Q4, Q5, and Q6, a constant current source I1, a diode D1, and resistors R6, R7, R8, R9 and R10. A bias voltage $V_{WH}$ for setting a level for the slice detection of a highlight signal of a level higher than a predetermined value (for example, 2–3 times as large as the rated level) is applied to the base of the transistor Q4 and a video signal is applied to the base of the transistor Q3. If the video signal exceeds the value $V_{WH}$, the transistor Q3 is turned ON, and the video signal is subject to current conversion through a current mirror circuit constituted by the diode D1, the resistors R7 and R8, and the transistor Q5 and is amplified with the ratio of R9/R6 so that a highlight signal with the same polarity as the input video signal is detected at the emitter of the transistor Q6.

The low luminance signal detector 48 is constituted by transistors Q8, Q9, Q10, and Q11, a constant current source I2, a diode D3, and resistors R15, R16, R17, R18, and R19. A bias voltage $V_B$ for determining a clipping level for obtaining a low luminance signal of a level lower than a predetermined value (for example, $\frac{1}{3}$ of the rated level) is applied to the base of the transistor Q9 and a video signal is applied to the base of the transistor Q8. If the video signal becomes lower than the value $V_B$, the transistor Q9 is turned ON, and the video signal is amplified with the ratio of R19/R15, and a low luminance detection signal is produced at the emitter of the transistor Q11. Resistors R11 and R20 constitute the adder 49 and a transistor Q7, a diode D2, and resistors R12, R13, and R14 constitute a current drawing DC level shifting circuit. By properly setting the resistance values of the resistors R12, R13, and R14, the operating point of the control voltage can be desiredly selected.

In a frequency separation system color video camera, generally, the tracking of the luminance signal, the R chrominance signal, and the B chrominance signal is improved to thereby improve the white balance all over a picture from its dark portion to its bright portion. That is, various signal processing means are used in which a luminance signal of a predetermined level is divided into three or four division signals and the gain of each of the separated carrier red chrominance signal and the carrier blue chrominance signal is controlled in response to each of the division luminance signals to improve the tracking with the luminance signal from the dark level to the bright level.

Figure 15:
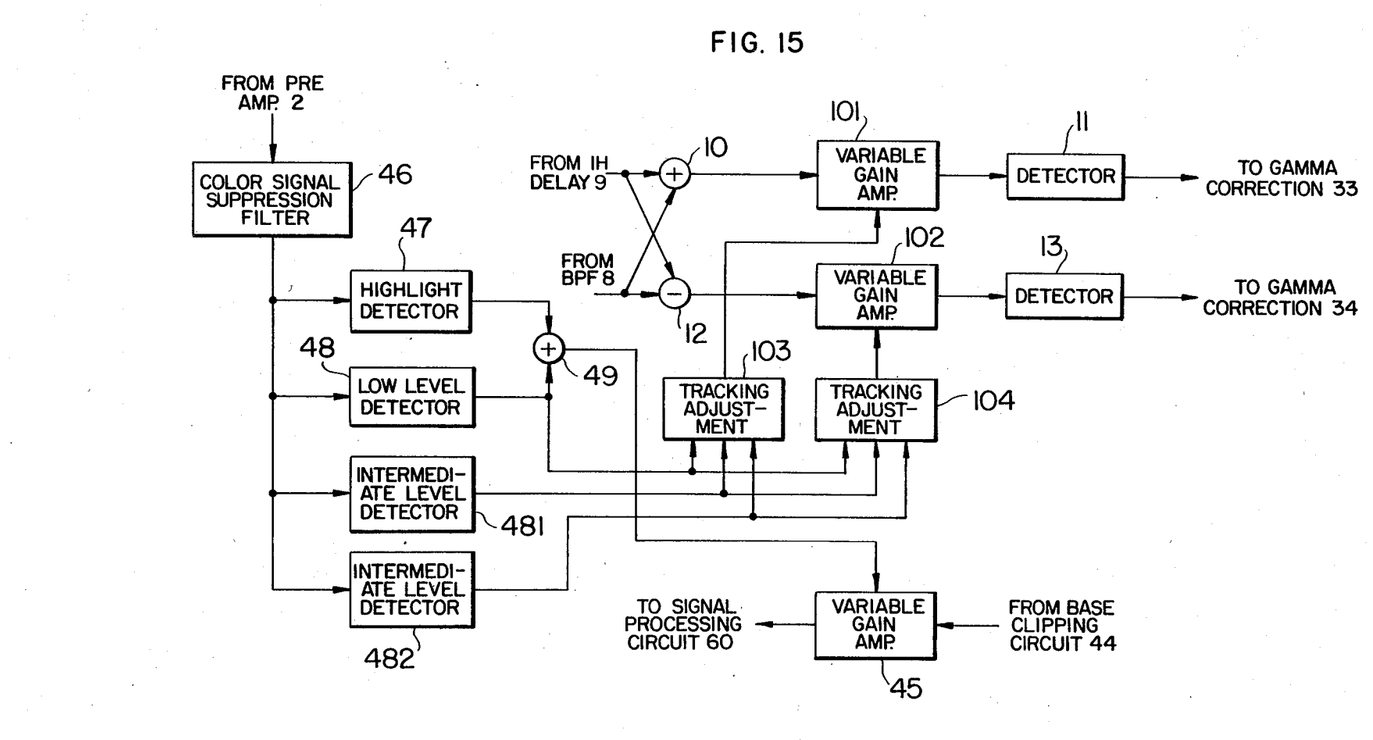
FIG. 15 is a block diagram showing a further embodiment of a signal processing circuit according to this invention.

The above-described signal processing means will be realized by the circuit arrangement of FIG. 15, for example. The circuit arrangement of FIG. 15 can be realized by adding, in addition to the circuit arrangement of FIG. 5, two intermediate level detectors 481, 482 for detecting two different intermediate levels between two levels detected by the highlight detector 47 and the low level detector 48, respectively, and variable gain amplifiers 101, 102 for controlling the amplitude of the separated carrier red chrominance signal and carrier blue chrominance signal in accordance with control signals. The detected outputs of the low level detector 48 and intermediate level detectors 481, 482 are applied to the variable gain amplifiers 101, 102 as the control signals through tracking adjustment circuits 103, 104.

In this case, the low luminance detection signal used in this embodiment and the low luminance component of the above-mentioned tracking correction signal may be commonly used, so that the present invention can be easily realized.

Next, description will be made as to signal processing means which is suitable to be added to the embodiment circuit as described and which improves the S/N ratio within the AGC operation range for low intensity of illumination of the object, and the picture quality and sensitivity at a dark portion.

Figure 11:
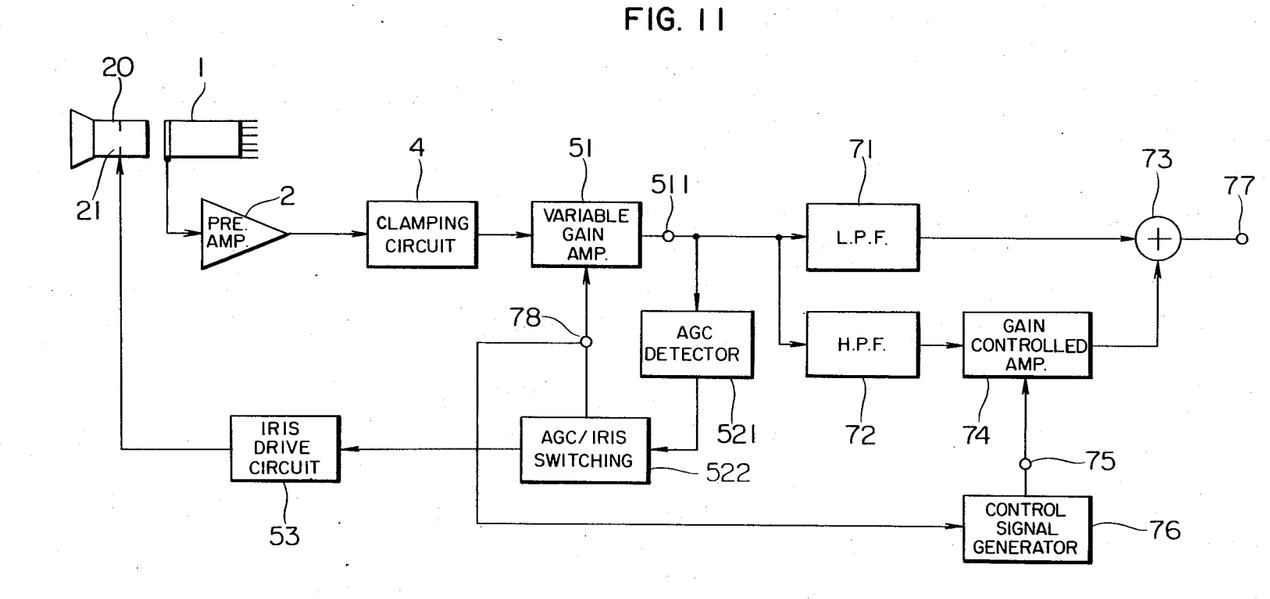
FIG. 11 is a block diagram showing an embodiment of a signal processing circuit suitable for use with the previously shown embodiments to improve the picture quality at a dark portion.

FIG. 11 shows an embodiment of a portion mainly for performing luminance signal processing to improve the S/N ratio and sensitivity at a dark portion. In FIG. 11, a luminance signal produced at an output terminal 511 of a variable gain amplifier 51 is applied to an AGC iris control voltage generating detector 521 and is separated into a low frequency band component and a high frequency band component through a low pass filter 71 and a high pass filter 72, respectively. The separated high frequency band component is applied to a gain controlled amplifier 74 and after gain control in accordance with a control voltage applied to a terminal 75 of the amplifier 74, is added in an adder 73 to the separated low frequency band component to thereby obtain a new luminance signal at an output terminal 77. An AGC control voltage at a terminal 78, which varies according to the quantity of gain control as shown by a broken line in FIG. 12, is applied to a control signal generator 76, to thereby obtain at the terminal 75 such a control voltage that the gain can be desiredly varied in response to an AGC voltage within the AGC operation range, that is the total frequency characteristic at the terminal 77 can be widely changed from the low frequency band characteristic to the high frequency band peaking characteristic, as shown in FIG. 13.

Figure 12:
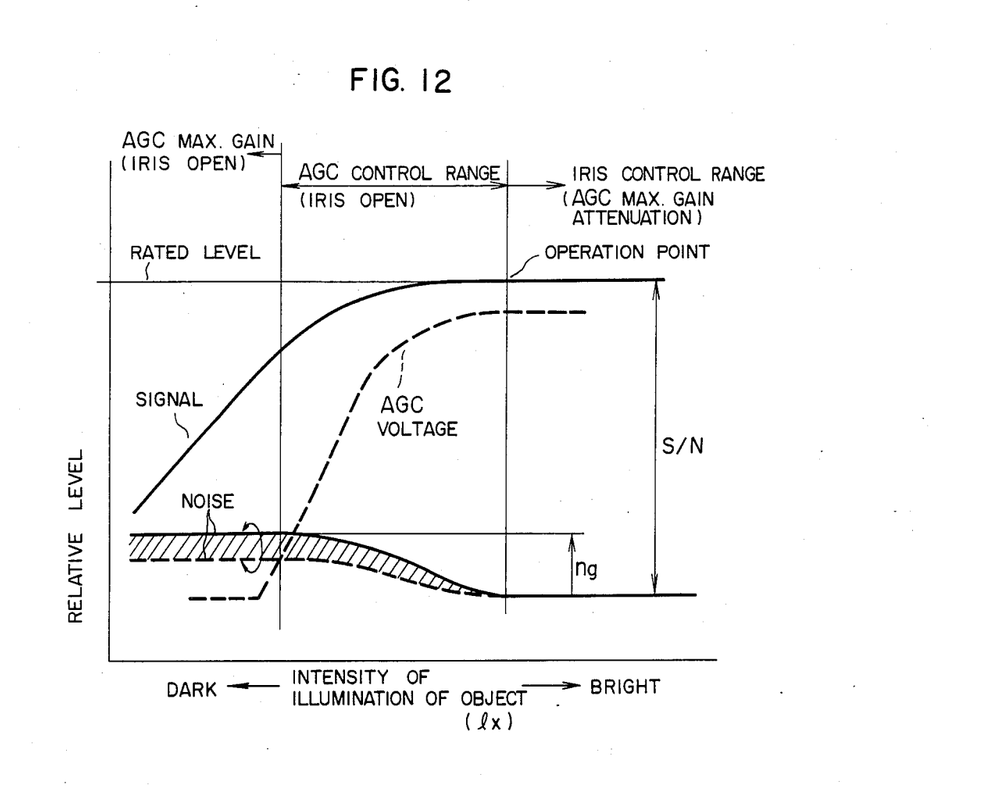
FIG. 12 is a graph showing the relation between the intensity of illumination of an object to be photographed and the status of operations for explaining the operation of the embodiment of FIG. 11.
Figure 13:
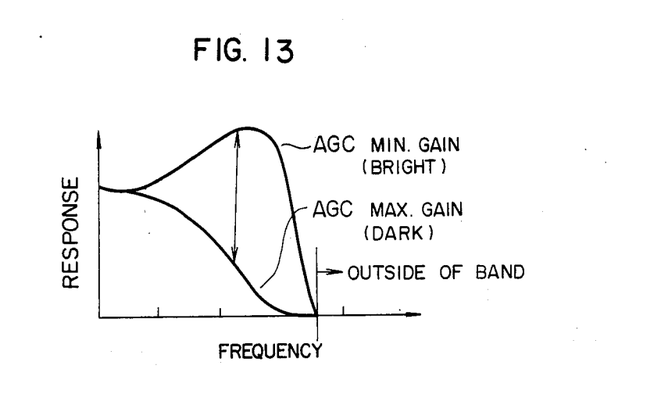
FIG. 13 is a graph showing the status of changes in frequency characteristic of the luminance signal in the embodiment of FIG. 11.

As described above, in the thus arranged circuit of this embodiment, as shown in FIG. 12, the quantity of incident light onto the image pickup element 1 is controlled to make the signal at the terminal 77 constant in a bright screen in which the intensity of illumination of an object is relatively large, that is in the iris control range, while the control sensitivity is set such that at a portion where the intensity of illumination of the object is low, the signal is gradually lowered under control of the variable gain amplifier 51, and if the object becomes darker after a predetermined maximum gain has been reached, the quantity of signal is lowered in proportion to the intensity of illumination of the object until it finally becomes zero. On the other hand, the noise generated at the terminal 77 is subject to the noise generated by the preamplifier 2 so that it is constant in the iris control range and the S/N ratio is constant. That is, in the situation that an object is relatively bright, the S/N ratio of, for example, about forty and several dB or more can be obtained and aperture correction is also effected, so that better picture quantity can be assured similarly to the conventional case. As described above, however, if the intensity of illumination of the object becomes lower and the status falls within the AGC control range, the absolute value of noise increases as the object becomes darker, that is in accordance with the AGC gain, to gradually reduce the S/N ratio to thereby finally extremely deteriorate the picture quality. The more the apparent sensitivity is increased by widening the AGC control range in order to enable a darker screen to be photographed, the more the picture quality will be deteriorated. According to the present invention, however, the total frequency characteristic at the terminal 77 is controlled in accordance with the quantity of AGC control as shown in FIG. 13, so that the quantity in accordance with the change, that is the high frequency band component, which will ordinarily increase, becomes smaller and finally there exists only the component which passes through the low pass filter 71.

That is, the noise quantity has such a character as indicated by a broken line in FIG. 12 that improvement is made by the hatched quantity. Although this hatched quantity is about 0–4 dB, this quantity is the improved quantity of the component in the high frequency band in which noise is visually significant and therefore granular snow noise is reduced so that the S/N ratio is remarkably improved. In the AGC control range, of course, as the object becomes darker, the high frequency band component in the total frequency characteristic is lowered so that the aperture correction effect is also gradually reduced. However, the purpose of providing an AGC circuit is that, even if the S/N ratio is deteriorated a little, it is possible to increase the sensitivity to enable the image to be picked up to a darker point by way of compensation for the deterioration in S/N ratio. That is, the improvement in sharpness under the condition of lowered S/N ratio is not so significant because such a portion where sharpness and precision are required is masked with noises and the picture quantity is largely deteriorated by the noises.

If the improvement in S/N ratio is attained in the manner provided by this embodiment, the picture is not subject to such unnaturalness that noise is significant only at the outline portion of the picture and a part of the signal is clipped when a base clipping circuit is inserted to try to improve the S/N ratio as is ordinarily effected. In this embodiment, the AGC control quantity relative to the change in the intensity of illumination of an object is somewhat reduced by decreasing the AGC loop gain as shown in FIG. 12 so that the signal quantity (that is "contrast") is somewhat reduced also in the AGC control range. However, the absolute value of the noise in the intensity of illumination of an object in the AGC control range is correspondingly reduced, so that the picture quantity is effectively improved to a remarkable extent. Further, if the AGC control range is widened by way of compensation for the noise improvement according to the present invention, the apparent sensitivity can be further improved.

Figure 14:
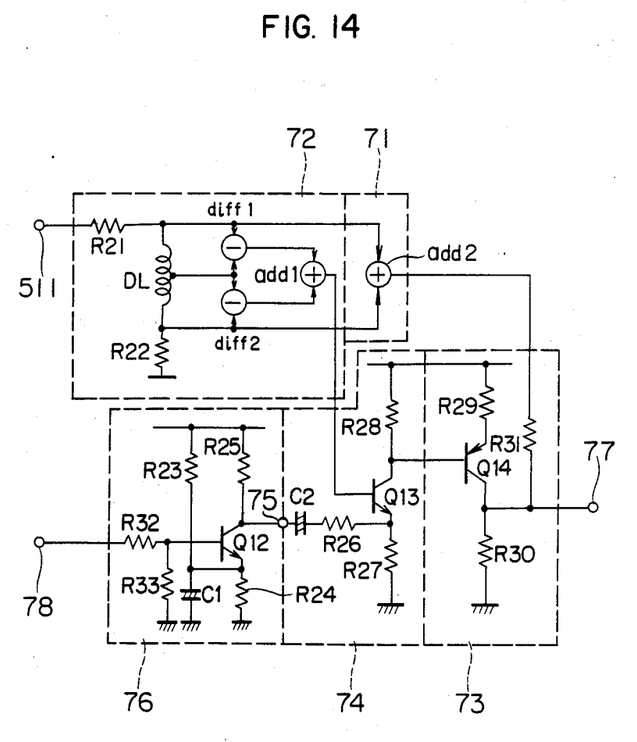
FIG. 14 is a circuit diagram of a specific circuit showing a main part of the embodiment of FIG. 11.

FIG. 14 shows a specific circuit diagram for achieving the benefits of this embodiment. In this circuit, resistors R21 and R22 are matching resistors for a delay line DL. A luminance signal is applied to a terminal 511 and a signal appearing at the center tap portion of the delay line DL and each of the input and output signals to the delay line DL are subject to subtraction by subtracters diff 1 and diff 2, respectively. The respective subtracted signals are added to each other by an adder add 1. Thus, the resistors R21 and 22, the delay line DL, the subtracters diff 1 and diff 2, and the adder add 1 constitute a quadratic differential high pass filter 72. The input and output signals of the delay line DL are added to each other by an adder add 2 which constitutes a low pass filter 71. Each of the subtracters diff 1 and diff 2, and the adders add 1 and add 2 can be easily realized by using ordinary operational amplifiers or the like. A high frequency band component obtained at the output of the adder add 1 is applied to the base of a transistor Q13 so as to be subject to gain control and is then applied to the base of a transistor 14. A low frequency band component obtained at the output of the adder add 2 is connected to the collector of the transistor Q14 through a resistor R31 and is added to the above-mentioned high frequency band component at a collector resistor R30 of the transistor Q14 to thereby obtain a new luminance signal at a terminal 77. An AGC control voltage applied to a terminal 78 is voltage-divided into a desired voltage through resistors R32 and R33 and is then applied to the base of a transistor Q12. The emitter voltage of the transistor Q12 is selected by resistors R23 and R24 such that the transistor Q12 is turned ON when the AGC circuit 51 reaches the maximum gain attenuation state (that is, a state where the iris is initiated to be closed), while, if the intensity of illumination of the object becomes dark and the variable gain amplifier 51 reaches the AGC control range the transistor Q12 is gradually turned OFF in accordance with the AGC control voltage and the transistor Q12 is completely turned OFF when the variable gain amplifier 51 reaches the maximum gain region. Capacitors C1 and C2 serve as bypass capacitors. Resistors R30, R29, R27, R28, R26, R25, R24, and R23 are desiredly designed and the collector-emitter resistance of the transistor Q12 is taken into consideration so that the high frequency band component applied to the base of the transistor of the transistor Q13 can control the total frequency characteristic obtained at the terminal 77 in response to the AGC control voltage.

If the embodiment described directly above is combined with the previously described embodiment, the S/N ratio at the dark portion can be improved and the sensitivity can be increased, and the combination is preferable for reduction in color noise particularly at the dark portion.

I claim:

1. A signal processing circuit for a color video camera in which a color video signal is obtained by using a single image pickup device provided with a color stripe filter on a photoconductive surface, said circuit comprising:

a clamping circuit for clamping a black level of a video signal produced from the image pickup device to a predetermined level determined by an externally applied reference potential;

correcting means for superimposing onto said reference potential a signal having a waveform with a polarity opposite to that of a shading waveform in said video signal;

means for deriving a luminance signal and a plurality of color difference signals from an output signal of said clamping circuit;

means for modulating a carrier chrominance signal with said derived color difference signals;

variable gain amplifier means for amplifying said carrier chrominance signal modulated with said color difference signals;

means for detecting the level of a luminance component of a video signal produced from said image pickup device; and means for controlling the gain of said variable gain amplifier means when said detecting means detects that the level of said luminance component is lower than a first predetermined level.

2. A signal processing circuit according to claim 1, in which said means for detecting the level of the luminance component of said video signal is disposed prior to an input of an automatic gain control means for controlling an amplitude of the output signal obtained from said clamping circuit.

3. A signal processing circuit according to claim 1, in which said means for detecting the level of the luminance component includes means for detecting when the level of the luminance component is lower than said first predetermined level to produce a low luminance signal and for detecting when the level of the luminance component is higher than a second predetermined level to produce a highlight signal, and means for adding said low luminance signal to said highlight signal to produce a gain control signal.

4. A signal processing circuit according to claim 3, in which said first predetermined level is set to a level which is ½ to ¼ of the way from a black level to a white level and said second predetermined level is set to a level which is 2-3 times higher than the white level.

5. A signal processing circuit according to claim 1, wherein said means for detecting the level of a luminance signal produced from said image pickup device includes means for allotting the detected level to one of a plurality of level ranges for controlling the levels of said plurality of color difference signals, thereby performing tracking control of the luminance signal and the chrominance signal to reduce a change in the white balance from a dark portion to a bright portion of a picture image.

6. A signal processing circuit for a color video camera in which a color video signal is obtained by using a single image pickup device provided with a color stripe filter on a photoconductive surface, said circuit comprising:

a clamping circuit for clamping a black level of a video signal produced from the image pickup device to a predetermined level determined by an externally applied reference potential;

correcting means for superimposing onto said reference potential a signal having a waveform with a polarity opposite to that of a shading waveform in said video signal;

a first variable gain amplifier circuit for amplifying an output signal of said clamping circuit;

means responsive to the magnitude of an output signal of said first variable gain amplifier circuit for controlling the gain of said first variable gain amplifier circuit such that the magnitude of said output signal becomes substantially constant;

a low pass and a high pass filter for deriving a low frequency band and a high frequency band component respectively from the output signal of said first variable gain amplifier circuit;

a second variable gain amplifier circuit for amplifying an output signal of said high pass filter;

means for adding an output signal of said low pass filter to an output signal of said second variable gain amplifier circuit; and means for generating a signal for controlling the gain of said second variable gain amplifier circuit in accordance with an output of said means for controlling the gain of said first variable gain amplifier circuit.

7. A signal processing circuit for a color video camera in which a color video signal is obtained by using a single image pickup device provided with a color stripe filter on a photoconductive surface, said circuit comprising:

a clamping circuit for clamping a black level of a video signal produced from the image pickup device to a predetermined level in accordance with an applied clamping voltage;

an amplifier circuit connected to an output of said clamping circuit;

a sample and hold circuit for sampling and holding an output voltage of said amplifier circuit;

a reference voltage generating circuit for generating a reference voltage formed by superimposing a correction signal for correcting a shading waveform in said video signal on a predetermined DC voltage;

a comparator circuit for comparing said sampled voltage from said sample and hold circuit with said reference voltage, an output voltage of said comparator circuit being applied to said clamping circuit as said clamping voltage;

means for deriving a luminance signal and a plurality of color difference signals from an output signal of said clamping circuit;

means for modulating a carrier chrominance signal with said derived color difference signals;

variable gain amplifier means for amplifying said carrier chrominance signal modulated with said color difference signals;

means for detecting the level of a luminance component of a video signal produced from said image pickup device; and means for controlling the gain of said variable gain amplifier means when said detecting means detects that the level of said luminance component is lower than a first predetermined level.

8. A signal processing circuit according to claim 7, in which said means for detecting the level of the luminance component of said video signal is disposed prior to an input of an automatic gain control means for controlling an amplitude of the output signal obtained from said clamping circuit.

9. A signal processing circuit according to claim 7, in which said means for detecting the level of the luminance component includes means for detecting when the level of the luminance component is lower than said first predetermined level to produce a low luminance signal and for detecting when the level of the luminance component is higher than a second predetermined level to produce a highlight signal, and means for adding said low luminance signal to said highlight signal to produce a gain control signal.

10. A signal processing circuit according to claim 9, in which said first predetermined level is set to a level which is $\frac{1}{2}$ to $\frac{1}{4}$ of the way from a black level to a white level and said second predetermined level is set to a level which is 2-3 times higher than the white level.

11. A signal processing circuit according to claim 7, wherein said means for detecting the level of a luminance signal produced from said image pickup device includes means for allotting the detected level to one of a plurality of level ranges for controlling the levels of said plurality of color difference signals, thereby performing tracking control of the luminance signal and the chrominance signal to reduce a change in the white balance from a dark portion to a bright portion of a picture image.

12. A signal processing circuit for a color video camera in which a color video signal is obtained by using a single image pickup device provided with a color stripe filter on a photoconductive surface, said circuit comprising:

a clamping circuit for clamping a black level of a video signal produced from the image pickup device to a predetermined level in accordance with an applied clamping voltage;

an amplifier circuit connected to an output of said clamping circuit;

a sample and hold circuit for sampling and holding an output voltage of said amplifier circuit;

a reference voltage generating circuit for generating a reference voltage formed by superimposing a correction signal for correcting a shading waveform in said video signal on a predetermined DC voltage;

a comparator circuit for comparing said sampled voltage from said sample and hold circuit with said reference voltage, an output voltage of said comparator circuit being applied to said clamping circuit as said clamping voltage;

a first variable gain amplifier circuit for amplifying an output signal of said clamping circuit;

means responsive to the magnitude of an output signal of said first variable gain amplifier circuit for controlling the gain of said first variable gain amplifier circuit such that the magnitude of said output signal becomes substantially constant;

a low pass and a high pass filter for deriving a low frequency band and a high frequency band component respectively from the output signal of said first variable gain amplifier circuit;

a second variable gain amplifier circuit for amplifying an output signal of said high pass filter;

means for adding an output signal of said low pass filter to an output signal of said second variable gain amplifier circuit; and means for generating a signal for controlling the gain of said second variable gain amplifier circuit in accordance with an output of said means for controlling the gain of said first variable gain amplifier circuit.

13. A signal processing circuit according to claim 12, in which said means for generating the signal for controlling the gain of said second variable gain amplifier circuit generates a signal which controls the gain of said second variable gain amplifier circuit such that the rate of change in said gain is smaller than the rate of change in gain which would be produced in accordance with the intensity of light detected by said image pickup device.

* * * * *